March 23, 1965  J. S. BEST  3,174,368
APPARATUS FOR CUTTING SHEET MATERIAL
Filed June 23, 1961
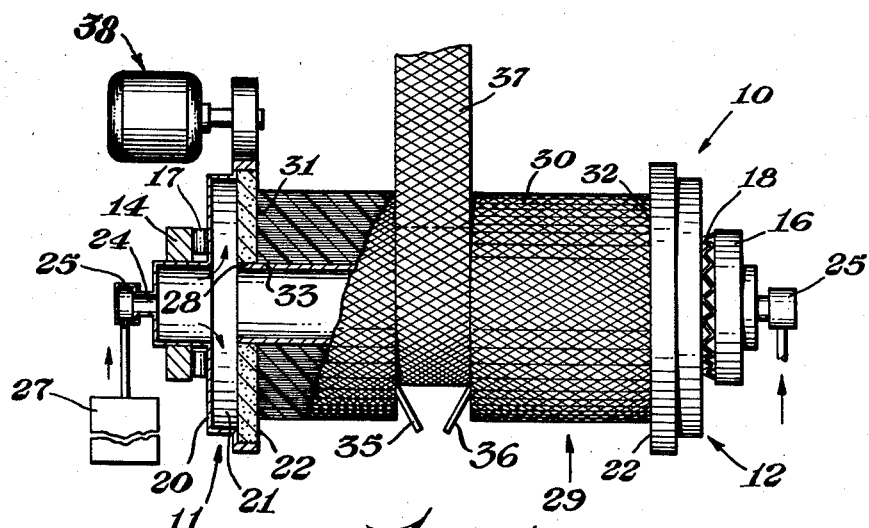
Fig. 1
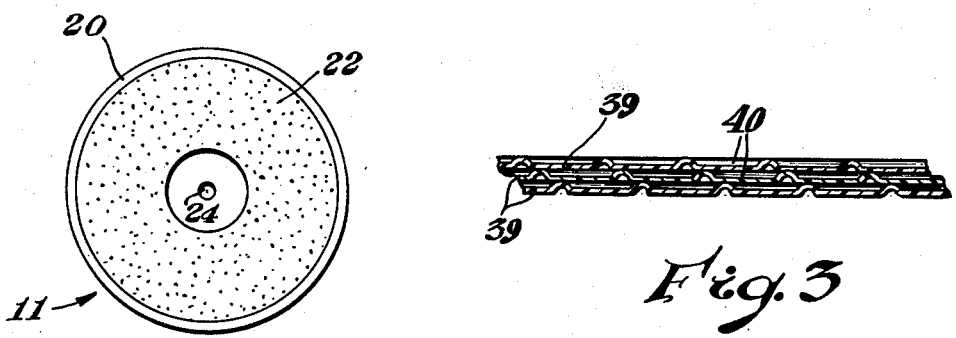
Fig. 2
Fig. 3
INVENTOR.
John S. Best
BY
Robert B. Ingraham
AGENT

United States Patent Office 3,174,368
Patented Mar. 23, 1965

3,174,368
APPARATUS FOR CUTTING SHEET MATERIAL
John S. Best, Midland, Mich., assignor to The Dow Chemical Company, Midland, Mich., a corporation of Delaware
Filed June 23, 1961, Ser. No. 119,157
6 Claims. (Cl. 82—50)

This invention relates to an improved method of cutting embossed sheet material.

It more particularly relates to an improved method of cutting sheet material in roll form.

Plastic and metal sheets frequently are embossed with attractive and utilitarian designs. Generally, such embossed sheet material is initially prepared and stored in the form of a relatively large supply roll. Frequently for many applications, narrower widths are desirable in preference to the full width of the supply roll which, in many cases, will be 4, 5 or even 6 or more feet. Advantageously, such supply rolls are slit into narrower widths more suitable to the customers requirements and rewound into narrower rolls. Usually in such an operation, an embossed or other similarly deformed film or sheet must be unwound, slit and rewound into two or more rolls. In certain cases, supply rolls of solid flat film, that is, not embossed may be slit by rotating the supply roll in a lathe-like device, holding a suitable cutting tool against the roll and unwinding a narrow strip which may be discarded as scrap or alternately a relatively wide strip may be removed and rewound into a narrower roll leaving the original supply roll in the form of two narrower rolls on a common core. When such a technique is applied to an embossed film, cutting is extremely difficult because an embossed film generally can not be wound into a tight supply roll, but is relatively loose and will deform readily under pressure of a cutting tool. Such deformation gives rise to undesirable friction in the case of thermoplastic films and subsequent fusion of the edges. Usually in the case of foils and metallic sheets such as aluminum and the like, undesired distortion and deformation will occur adjacent the severed edges.

It is an object of this invention to provide an improved apparatus for the slitting of the supply roll of embossed film.

It is a further object of this invention to provide an improved method of slitting a supply roll of embossed film.

It is yet another object of this invention to provide a method and apparatus for the slitting of a supply roll of an embossed foil which will prevent overheating and deformation of the slit edges.

These benefits and other advantages may be obtained by employing in the slitting of the roll of embossed sheet material an apparatus comprising: a support member having rotatably mounted thereon means to engage opposite ends of a roll of sheet material, and rotate said roll about its axis of generation, at least one of said means to engage an end of said roll being pervious to fluid and adapted to be in communication with pressurized fluid supply means and means for slitting said sheet while wound on said roll.

The invention also contemplates a method of slitting a supply roll of embossed foil comprising rotatably supporting a supply roll of embossed sheet material, said roll being rotatable about its axis of generation, applying a fluid pressure to at least one end face of said roll, said pressure being sufficient to inflate and hold the outer layer of said roll under tension, rotating said roll, slitting at least one layer per revolution of the roll of said embossed sheet and removing at least one slit portion from the supply roll as a strip.

Further features and advantages of the invention will be more apparent in the following description and specification taken in connection with the accompanying drawing wherein:

In FIGURE 1 there is illustrated a schematic, partly-in-section view of a method and apparatus of the invention.

FIGURE 2 is a face view of the roll and engaging means in accordance with the invention.

FIGURE 3 is a cross sectional view of a plurality of layers of an embossed sheet which may be slit in accordance with the invention.

In FIGURE 1 there is illustrated a schematic partly-in-section view of an apparatus in accordance with the invention generally designated by the reference numeral 10. The apparatus 10 comprises a pair of roll engaging assemblies 11 and 12. The roll engaging assembly 11 is rotatably mounted to the journal bearing or supporting means 14. The assembly 12 is mounted in the bearing or support means 16. Resilient means 17 and 18 are provided between the journal bearings 14 and 16 and the end assemblies 11 and 12 to resiliently urge the end assemblies toward each other and perform the function of thrust bearings. The end assembly 11 comprises a housing 20 defining a plenum chamber 21 having supported therein a permeable disc 22. The housing 20 defines a fluid inlet port 24 in operative association with a swivel joint 25. The swivel joint 25 in turn is in communication with a fluid supply means 27. The end assembly 12 is constructed in a similar manner to an end assembly 11. A supply roll 29 of embossed sheet or film 30 having ends 31 and 32 is mounted between the end assemblies 11 and 12. The ends 31 and 32 are in engagement with the permeable plates 22. The supply roll 29 has a core or mandrel 33 which is inserted into a recess 29 in the plate 22. In operative engagement with the surface of the roll 29 are two knives 35 and 36 which sever the strip 37 from the main body of the supply roll 30. The assembly is rotated by the driving means 38 in engagement with the roll engaging assembly 12.

In FIGURE 2 there is illustrated an end view of the end assembly 11 showing the relationship between the housing 20, the permeable plate 22, the recess 28 and the fluid port 24.

FIGURE 3 is a cross sectional view of a plurality of superimposed layers of embossed film 39, showing spaces 40 between layers of the film.

Advantageously, in operation of the invention the loose end of the film 30 of a supply roll 29 is secured to the main body of the roll by means of adhesive tape or a similar fastening means. The roll 29 is then positioned between the end assemblies 11 and 12, the projecting core 33 of the roll 30 being inserted into the aperture 28 of the porous plates 22 of an assembly 11 and being similarly engaged by the end assembly 12 on the opposite end.

The springs 17 and 19 serve to maintain a tight engagement between the faces 22 and the roll's ends 31 and 32. Fluid under pressure such as compressed air which is fed from a supply source through a rotary joint 25 and into the plenum chamber 21. The air or fluid then passes through the permeable plates 22 and serves to inflate the loosely wound roll 29, causing the outer layers thereof to distend outwardly. The roll end engaging means are rotated and the cutting knives 35 and 36 are simultaneously brought into engagement with the outer layer of film 30 of the roll 29. After an initial cut is made about the circumference of the roll 29, the strip 37 is loosened and removed. The supply roll 29 is subsequently rotated. The cutting knives 35 and 36 are advanced into the roll at a rate of at least one thickness of the embossed foil per revolution of the supply roll. Thus, this operation may be continued until the supply roll 29 is severed into 3 parts, two rolls corresponding to the end portions 31 and 32 and a third portion corresponding to the removed strip 37.

Slitting a supply roll of embossed film in accordance with the invention may be carried out at relatively high speeds, that is, from 500 to 2,000 feet per minute on conventional equipment. Such speed appears to be limited by the geometry of the supply roll and dynamic balance of the assembly as a whole.

The pervious plate 22 may be fabricated from a wide variety of material. In certain cases a metal plate may be employed having a plurality of holes drilled therethrough in communication with the plenum chamber 21. Generally it is advantageous in most operations to provide a graded air distribution across the face of such a plate and larger openings are disposed toward a central portion of the plate and smaller toward the periphery. Beneficially, sintered metal plates are employed or face plates are prepared from a thin perforated smooth sheet of metal and backed with a relatively heavy metal grill or lattice. In cases where roll end regularity, that is, the end faces of the roll do not have even and uniform geometry a very satisfactory face plate 22 may be prepared from a heavily perforated metal plate having an open celled sponge or foam plastic material adhered thereto to engage and seal the irregular ends.

By way of further illustration, embossed rolls of polyethylene film were cut in accordance with the invention and no tendency was observed of deformation or fusion of the edges together at speeds as high as about 1,000 feet per minute.

As is apparent from the foregoing specification, the apparatus and method of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An apparatus for holding and slitting a roll of embossed sheet material, said apparatus comprising a support member having rotatably mounted thereon means to engage opposite ends of a roll of sheet material, and rotate said roll about its axis of generation, at least one of said means to engage an end of said roll being pervious to fluid and adapted to be in communication with pressurized fluid supply means said pervious means to engage an end of said roll being so constructed and arranged so as to provide communication between a fluid pressure supply and the edge of the embossed sheet material and means for slitting said sheet while wound on said roll.

2. An apparatus in accordance with claim 1, wherein both of said end engaging means are fluid pervious.

3. In an apparatus for slitting a roll of embossed sheet material, said apparatus comprising support members to engage opposite ends of said roll of said material and so constructed and arranged that said roll is rotatable about its axis of generation, generally at least one knife like member adapted to engage the periphery of said roll and advance toward the center thereof as said roll is rotated, the improvement which comprises at least one of the support members being pervious to fluid and adapted to be in communication with a pressurized fluid supply, the pervious support member being so constructed and arranged so as to provide communication between a fluid pressure supply and at least one end of a roll of embossed sheet material and the edge of the embossed sheet material.

4. The apparatus of claim 3, wherein said support members to engage opposite ends of said roll comprise a housing defining a plenum chamber, said plenum chamber having a roll engaging face comprised of a generally planar fluid pervious member.

5. In an apparatus for slitting a roll of embossed sheet material, said apparatus comprising means to support said roll of said material and so constructed and arranged that said roll is rotatable about its axis of generation, generally at least one knife like member adapted to engage the periphery of said roll and advance toward the center thereof as said roll is rotated, the improvement which comprises a pair of support members as means to support the roll and which engage opposite ends of the roll, said support members comprising a housing defining a plenum chamber, said plenum chamber being provided with a rotatable connection for a fluid supply, a roll engaging face comprised of a generally fluid pervious member and resilient means to urge said roll support members to each other.

6. In an apparatus for slitting a roll of embossed sheet material, said apparatus comprising means to support said roll of said material and so constructed and arranged that said roll is rotatable about its axis of generation, generally at least one knife like member adapted to engage the periphery of said roll and advance toward the center thereof as said roll is rotated, the improvement which comprises a pair of support members as means to support the roll, the support members which are so constructed and arranged so as to engage opposite ends of said roll, said support members comprising a housing defining a plenum chamber a passageway adapted to be in communication with a fluid supply in communication with the plenum chamber, said plenum chamber having a roll engaging face comprised of a generally planar fluid pervious member and said fluid pervious member defining a centrally positioned recess to receive a central core of a supply roll.

References Cited by the Examiner

UNITED STATES PATENTS

| | | | |
|---|---|---|---|
| 1,322,843 | 11/19 | Townsend | 82—47 |
| 1,573,613 | 2/26 | Johnstone | 82—47 |
| 2,457,310 | 12/48 | Judelshon | 82—86 |
| 2,520,826 | 8/50 | Beck | 29—113 XR |
| 3,084,576 | 4/63 | Dulebohn et al. | 82—46 |
| 3,094,026 | 6/63 | Pottle | 82—46 |

WILLIAM W. DYER, JR., Primary Examiner.

RICHARD H. EANES, JR., Examiner.